United States Patent Office 3,486,430
Patented Dec. 30, 1969

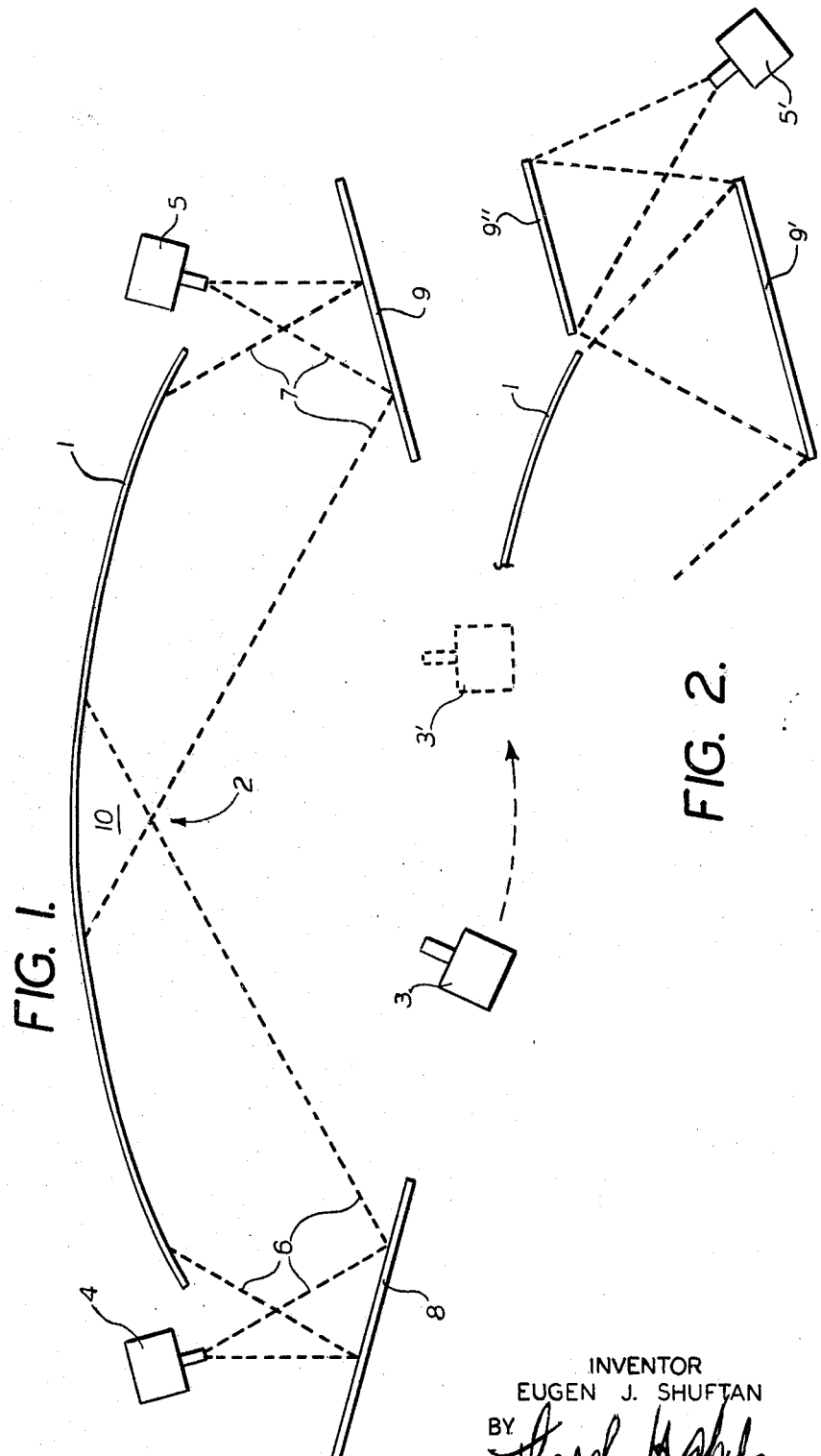

3,486,430
METHOD AND APPARATUS FOR PREPARING COMPOSITE PHOTOGRAPHS
Eugen J. Shuftan, 115 W. 71st St.,
New York, N.Y. 10023
Filed Oct. 27, 1967, Ser. No. 678,715
Int. Cl. G03b *29/00;* A63j *5/00*
U.S. Cl. 95—12                                10 Claims

ABSTRACT OF THE DISCLOSURE

An apparatus and method for the composition of pictures from transparencies projected onto a background and events occurring in front of the background. The projectors are located substantially in the plane of the background screen with the background image being reflected from mirrored surfaces. The reflecting surfaces are placed at an angle to the background screen to compensate for distortion caused by the angular projection. The low angle of incidence gives persons in front of the screen more room for movement.

---

This invention relates to the taking of photographic, television or any other pictures, and more specifically to the composing of pictures from transparencies representing the background and actual events occurring in front of the background.

The object of the invention is to provide a projection screen, means for projecting background pictures on the screen and a camera means for taking simultaneously with the projected pictures on the screen persons, objects or other events taking place in front of the screen, the projecting means being arranged at an angle with respect to the screen, and reflecting surfaces being arranged in the unsharp zone of the projecting beam at such angle with respect to projecting means and screen so as to compensate at least partially for any distortion caused by the angular position of the projecting means.

In the past, photo composition has been effected principally either by back projection onto the back of a transparent screen in front of which life events were taking place or alternatively by projection from the side, of transparencies which had to be distorted in order to compensate for the lateral position of the projector. Back projection onto a transparent screen is expensive as it requires a great deal of studio space, while lateral projection of distorted transparencies require exact positioning of the projector and rather expensive preparations of the distorted pictures.

In accordance with the invention these drawbacks are reduced if not eliminated.

Another object of the invention is to facilitate the taking of photographic or television pictures from a projection screen representing background, together with events occurring in front of the screen, in such a way as to provide for maximum speed of picture taking with a view of reducing rental of studio and equipment, and employment of actors and other personnel.

A further object of the invention is to permit a maximum of mobility for the camera for taking a sequence of picture scenes as quickly as possible, yet at the same time it provides, without movement of the camera, a variety of scenes and especially different views, derived from different backgrounds, in accordance with the requirements of the scenario of the film or television play to be produced.

In order to achieve this purpose in a specific embodiment, the background scenery is projected in the form of normal undistorted still-slides or motion picture film onto the screen from an angle or laterally, and all that is required to provide different scenic views corresponding to different relative positions between the actor or any other event occurring in front of the screen, and its background is to change the background picture in the projector without changing the position of the projectors.

These and other objects of the invention will be more fully apparent from the drawing annexed herein, in which FIG. 1 represents an embodiment of certain principles of the invention, and FIG. 2 a modification of FIG. 1.

As apparent from the drawing part 1 represents diagramatically a projection screen which is slightly curved but if necessary could also be straight; the curvature may serve, for example to additionally compensate for any distortion in the background picture transparency projected thereon.

In front of screen 1, there is a space or stage schematically indicated at 2, occupied by persons, objects or generally by live events, to be taken, photographed, televised or otherwise recorded together with the transparencies projected on screen 1 and representing the background of the scene to be taken.

In front of projection screen 1, as schematically indicated at 3, is a camera 3 arranged to record the background projected on screen 1 together with the events taking place at 2 in front of screen 1. Camera 3 may be a still, motion picture, television or any other video recording mechanism without department from the scope of this invention.

Further, in accordance with the invention, at left and right sides of screen 1, slide or film projectors 4, 5 of otherwise well-known construction, are arranged which serve to project on projection screen 1 still or moving transparencies representing the background of the scene or scenes to be taken by camera 3.

In the path of light beams 6, 7 directed from projectors 4, 5 respectively, onto screen 1 reflecting surfaces or mirrors schematically indicated at 8, 9 respectively, are arranged at angles with respect to the axis of projectors 4 and 5 respectively, and with respect to projection screen 1 in such a way as to compensate for any distortions caused by the lateral arrangements of projectors 4, 5 respectively.

Projection beams 6, 7 and the corresponding slides or transparencies in projectors 4, 5 which represent the background, are preferably arranged to superimpose on each other at adjacent edge portions as indicated at 10 to compensate for any light reduction caused by the angular position of beams 6, 7.

In addition to, or instead of one or several projectors of the type shown at 4 and 5, other projectors may be arranged to project at an angle from above or below screen 1 respectively.

In order to reduce distortions to a minimum, reflecting surfaces such as indicated at 8 and 9 respectively, are arranged in the unsharp zone of projectors 4, 5 and any other projectors as may be arranged for angular projection, laterally, from above or below, in accordance with the invention.

In a specific embodiment of the invention camera 3 is arranged in a movable position, and in order to change the view of a scene, i.e. the relative position between an object (or a person) arranged at 2 with respect to its background on screen 1, the transparencies in one or both projectors, for example of the type shown at 4, 5 are replaced with other transparencies representing a different background so that by changing the position of camera 3 for example to position 3', the relative position of the events with respect to the background is changed and, therefore, a different aspect or movement of these events is produced in a minimum of operations and, of course, without being affected by the position of projectors 4, 5 and mirrors 8, 9.

Mirrors 8, 9 are of a high precision type, consisting, for example, of silver layers deposited on the front of glassplates.

Projectors 4, 5 can be readily arranged in a relatively fixed position, out of the range of sight of camera 3, 3'. Mirrors 8, 9 are arranged, movable and adjustable, to permit positioning and correction of the background pictures on screen 1.

As apparent from the modification shown in FIG. 2, a projector 5' can be disposed in an off-side position still closer to screen 1, and its picture can be directed to screen 1 over several mirrors, all or some of them being adjustable, as schematically indicated at 9' and 9", respectively.

While the invention has been shown and described by way of certain apparatus and arrangements of apparatus, it is not limited thereto, but may be applied in any manner whatsoever without departing from the scope of this disclosure.

I claim:

1. In combination, a projection screen and means arranged in front of said screen for taking pictures projected on said screen together with events occurring in front thereof, means arranged on the side and substantially within the plane of the screen for projecting pictures at an angle onto said screen including reflecting means arranged on the side of said screen and in front of said projecting means at an angle with respect to the axis of both said projecting means and said projection screen, so as to permit at least partially to compensate distortion of the picture projected on said screen due to the angular position of said projecting means while reducing the angle of incidence of the projecting beam to a minimum.

2. Arrangement according to claim 1, wherein said screen is slightly curved to additionally compensate for picture distortion.

3. Arrangements according to claim 1 wherein said reflecting surface is slightly curved to additionally compensate for picture distortion.

4. Arrangement according to claim 1 wherein said reflecting surface is arranged in an unsharp zone of the projecting means associated therewith.

5. Arrangement according to claim 1, wherein said projecting means are arranged at both sides of said projection screen.

6. Arrangement according to claim 1 wherein said projecting means are arranged on top of said projection screen to project at an angle with respect to said projection screen.

7. Arrangement according to claim 1 wherein said projecting means are arranged below said projecting screen to project at an angle with respect thereto.

8. Arrangement according to claim 1 wherein said projecting means are arranged at opposite sides of said projection screen, having corresponding beams arranged to superimpose on each other at adjacent edge portions thereof, to compensate for any light reduction caused by the angular position of said projecting means.

9. In a picture composition process, the steps of projecting one of a series of background transparencies at an angle onto a screen, from a position on the side and substantially within the plane of said screen, after reflecting said background to reduce the angle of incidence while simultaneously reducing distortion due to its angular direction arranging events to occur in front of said screen, simultaneously recording said background and said events from the front of said screen, and changing said background to produce another relative position between said events and said background, without substantially changing the direction of said projections.

10. A process according to claim 9 wherein projecting beams are projected at an angle from opposite sides of the screen, and said beams are superimposed at adjacent edge portions to compensate for light reduction caused by the angular direction of said beams.

References Cited

UNITED STATES PATENTS 3,059,525  10/1962  Shuftan _____ 352—89
3,101,643  8/1963  McCullough _____ 352—70

NORTON ANSHER, Primary Examiner

W. A. SIVERTSON, Assistant Examiner

U.S. Cl. X.R.
352—89